(12) United States Patent
DeCourcy et al.

(10) Patent No.: US 7,128,085 B2
(45) Date of Patent: Oct. 31, 2006

(54) VALVE MOUNTING ASSEMBLY HAVING A FLUID PORT FOR WASHING UNWANTED MATERIAL ACCUMULATIONS OFF THE VALVE

(75) Inventors: Michael Stanley DeCourcy, Houston, TX (US); Connie Sue Williams, Pasadena, TX (US); David Alec Williams, Houston, TX (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/186,313

(22) Filed: Jul. 21, 2005

(65) Prior Publication Data

US 2005/0252551 A1    Nov. 17, 2005

Related U.S. Application Data

(62) Division of application No. 10/465,487, filed on Jun. 19, 2003, now Pat. No. 6,983,758.

(60) Provisional application No. 60/394,011, filed on Jul. 5, 2002.

(51) Int. Cl.
*F16K 51/00*    (2006.01)

(52) U.S. Cl. ................................... 137/240

(58) Field of Classification Search ............... 137/240, 137/68.19, 68.21
See application file for complete search history.

(56) References Cited

U.S. PATENT DOCUMENTS 3,402,418 A    9/1968  LeRoy et al.

(Continued)

FOREIGN PATENT DOCUMENTS

DE    3102828    8/1982

(Continued)

OTHER PUBLICATIONS

JP 09166226, Abstract, Oct. 31, 1997.

(Continued)

*Primary Examiner*—Kevin Lee
(74) *Attorney, Agent, or Firm*—Marcella Bodner; Alan Holler

(57) ABSTRACT

In one embodiment, the invention provides a rupture disk assembly having a rupture disk and a rupture disk holder. The rupture disk holder has a first annular member downstream of the rupture disk, a second annular member upstream of the rupture disk, and an optional third annular member upstream of the second annular member. An outer peripheral portion of the rupture disk is sandwiched between the first and second annular members; and, if a third annular member is present, (a) the second annular member is sandwiched between the outer peripheral portion of the rupture disk and the third annular member, and (b) the third annular member includes a fluid port aimed at the rupture disk. However, if the third annular member is not present, the second annular member includes a fluid port aimed at the rupture disk. In another embodiment, the invention provides an equipment access assembly having an equipment access cover, an equipment access cover mount, and an annular member between the equipment access cover and cover mount. The annular member includes a fluid port aimed at the equipment access cover. In yet another embodiment, the invention provides a valve mounting assembly having a downstream valve mount, an upstream valve mount, a valve intermediate the downstream and upstream valve mounts, and an annular member intermediate the valve and the upstream valve mount. The annular member includes a fluid port aimed at the valve.

3 Claims, 9 Drawing Sheets

U.S. PATENT DOCUMENTS

| | | | |
|---|---|---|---|
| 3,485,082 A * | 12/1969 | Myers | 137/69 |
| 3,768,299 A | 10/1973 | Garren | |
| 4,112,763 A | 9/1978 | Pirlet et al. | |
| 4,158,508 A | 6/1979 | Durant | |
| 4,263,929 A | 4/1981 | Kearney | |
| 4,462,420 A | 7/1984 | Cullie et al. | |
| 4,541,277 A | 9/1985 | Starnes, Jr. | |
| 5,579,942 A | 12/1996 | Palmer et al. | |
| 5,934,308 A | 8/1999 | Farwell | |
| 6,409,886 B1 | 6/2002 | Matsumoto et al. | |

FOREIGN PATENT DOCUMENTS

| | | |
|---|---|---|
| EP | 0009441 | 4/1980 |
| EP | 0563853 | 10/1993 |
| EP | 1044957 | 10/2000 |

OTHER PUBLICATIONS

JP 2202168354, Abstract, Oct. 10, 2002.

JP 59144877, Aug. 20, 1984.

* cited by examiner

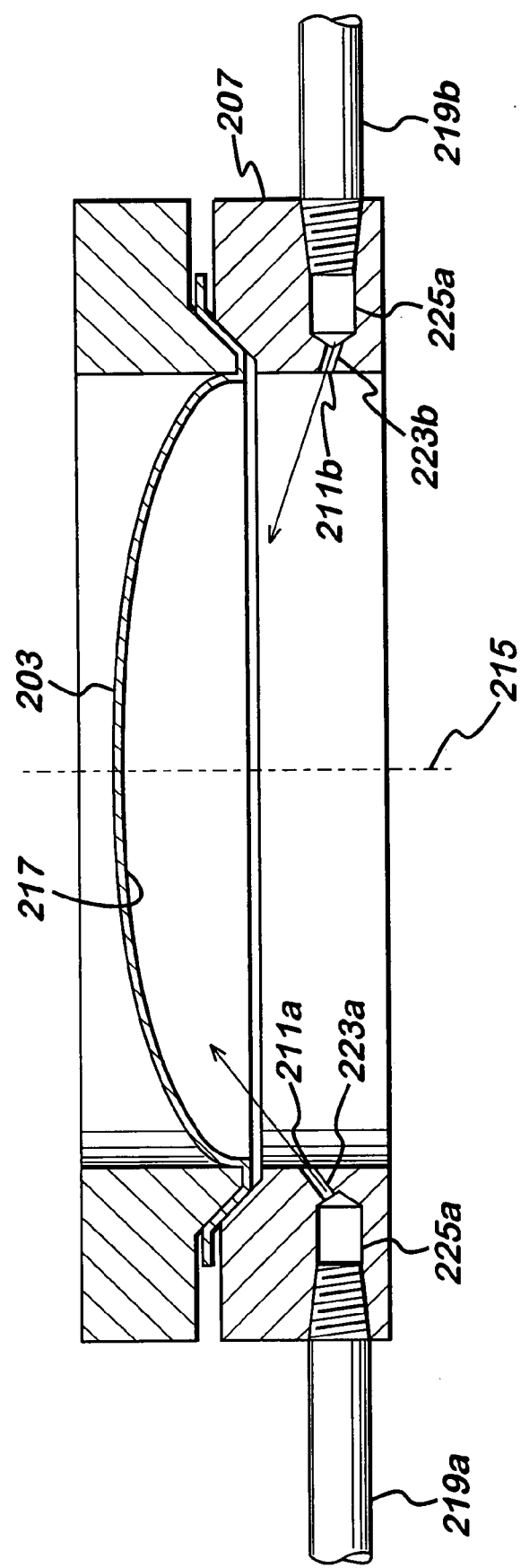

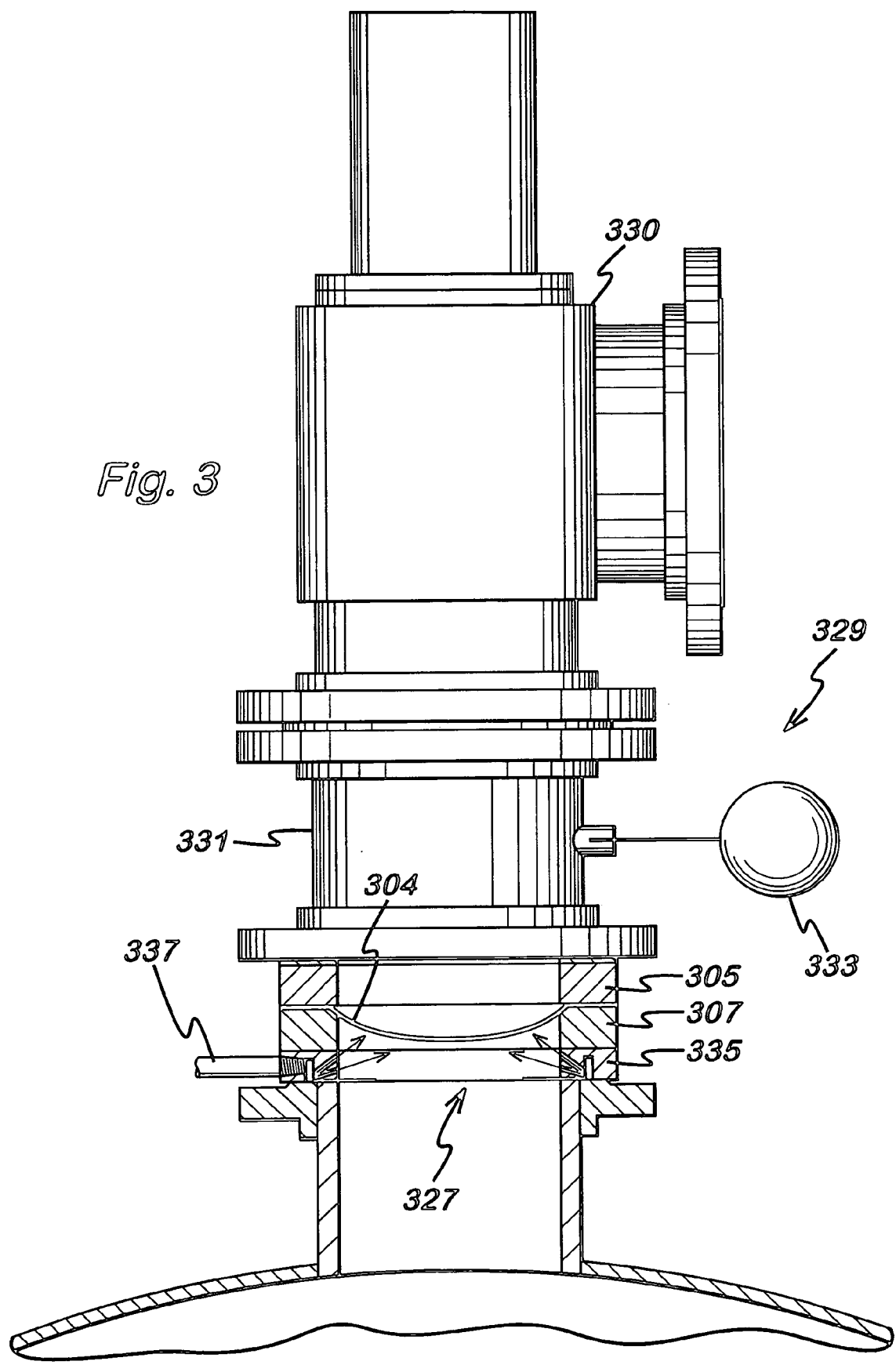

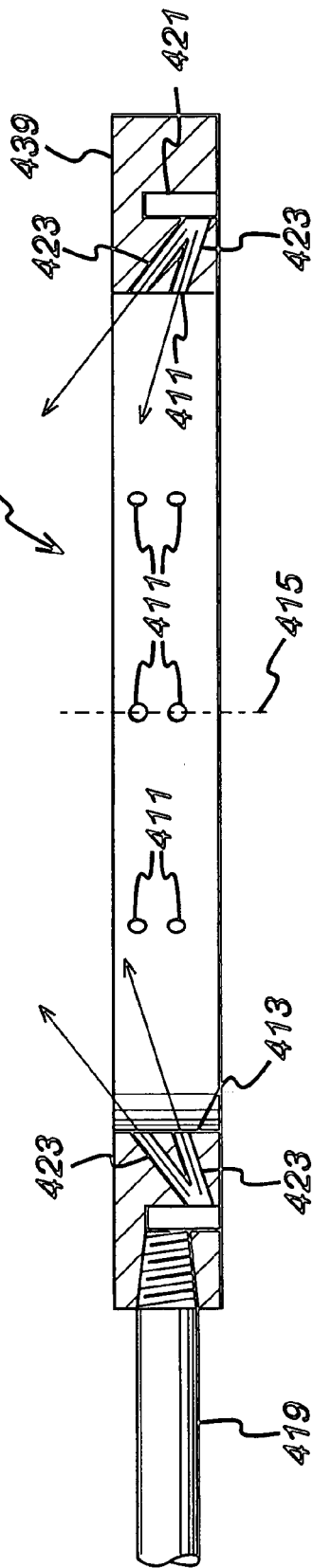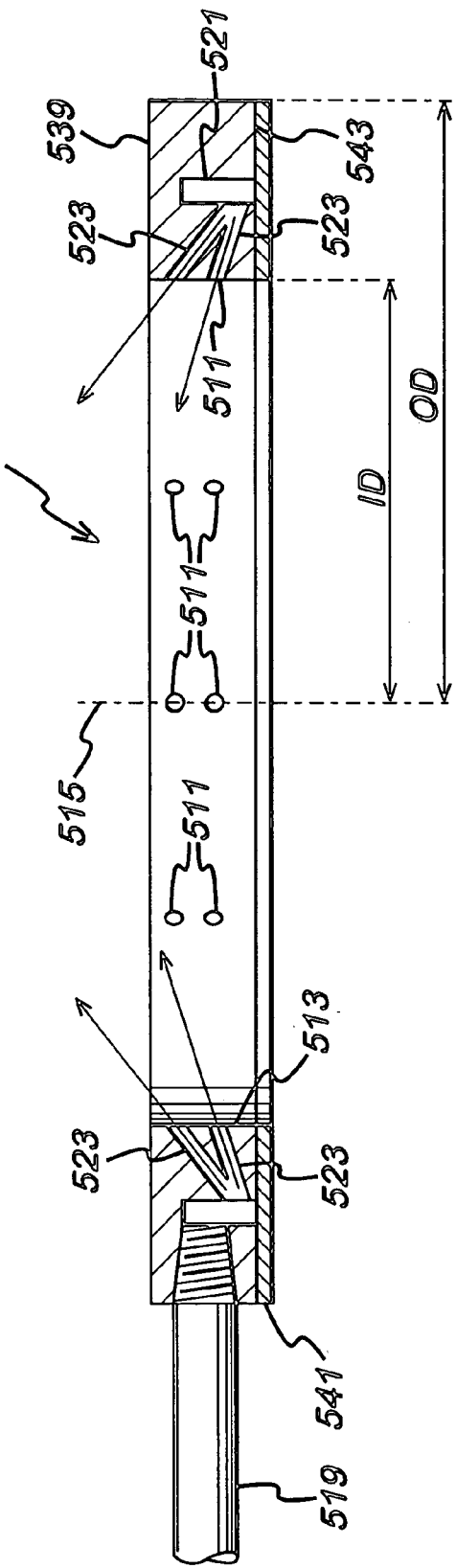

VALVE MOUNTING ASSEMBLY HAVING A FLUID PORT FOR WASHING UNWANTED MATERIAL ACCUMULATIONS OFF THE VALVE

This non-provisional application is a divisional of non-provisional U.S. patent application Ser. No. 10/465,487, filed Jun. 19, 2003, now U.S. Pat. No. 6,983,758, benefit of which is claimed under 35 U.S.C. § 120 and which in turn claims benefit under 35 U.S.C. § 119(e) of U.S. provisional Application No. 60/394,011, filed Jul. 5, 2002, priority benefit of which is also claimed for the present application.

The accumulation of unwanted material in low flow regions of process equipment is a problem which adversely affects the chemical process industries on a daily basis. Unwanted materials may comprise by-products, residues, polymers, scale, dusts, corrosion products, precipitates, or other solids, liquids or vapors. Unwanted materials may restrict process flows, initiate undesirable side reactions (such as stress corrosion cracking), seed polymer growth, and render secondary process devices—such as valves and instrumentation—inoperable. The accumulation of unwanted material is costly in that it requires process downtime and manpower to remove these materials and to repair associated damage to the process equipment and piping that may have occurred. In addition, hazardous situations can result when safety equipment, such as pressure relief devices, are isolated from the process through the accumulation of unwanted materials in the process connections to which they are attached.

In the chemical process industries, one especially prevalent category of unwanted material accumulation is the formation of "condensation polymer". Condensation polymer forms when vapor-phase monomers condense onto equipment surfaces in the absence of suitable polymerization inhibitors and then undergo polymerization. Monomers known to undergo condensation polymerization include but are not limited to (meth)acrylic acid and its esters, vinyl chloride, hydrogen cyanide, acrylonitrile, styrene, and other vinyl monomers.

One known method for combating condensation polymerization in the vapor spaces of process equipment such as storage tanks, reaction kettles and distillation columns, is to maintain the surface temperature of the equipment above the dew point of the monomer(s); jacketing, insulation and electric or steam tracing of process equipment has been shown to be relatively effective in "open-flow" regions, i.e. regions where the vapor-phase monomer can freely flow away from the heated surfaces. This approach is ineffective, however, in low flow regions such as process connections where the monomer vapors can stagnate and become trapped; this situation is further exacerbated when the process connection is a vessel nozzle, oriented vertically on the top head of the process equipment in question.

Addition of vapor-phase inhibitors has also been tried as a means for preventing condensation polymerization inside process equipment such as distillation columns. Examples of such inhibitors include $SO_2$ in hydrogen cyanide service and NPH in (meth)acrylic acid service. Because low flow regions, such as nozzles, are essentially stagnant, however, vapor-phase inhibitors tend not to flow into them and unwanted material accumulation can proceed essentially unabated.

Another method for combating condensation polymerization in the vapor spaces of process equipment is through the use of internal spray devices. European Published Patent Application No. 1 044 957 A1 teaches the use of a "spraying and supplying means" placed inside a distillation column to spray liquid on interior surfaces of the distillation column, with the intent of inhibiting polymer formation. By design, however, this type of spray device is most effective in addressing polymer growth in large, open-flow regions, such as the top head o a distillation column or storage tank. This approach fails to adequately prevent the simultaneous accumulation of material in small, low-flow regions, such as the process connections on the top heads of tanks and columns.

In those cases where accumulations must also be prevented in small process connections, such as vessel nozzles, European Published Patent Application No. 1 044 957 A1 suggests that one or more spray nozzles may additionally be employed to specifically spray these connections. FIG. 10 of the present application illustrates such an embodiment wherein a spraying and supplying means is employed in combination with a top head connection to which a relief device (typically a rupture disk and relief valve assembly) is attached. The insertion of a single spray nozzle into the process connection from below is illustrated; in this configuration, a liquid spray would be direct upward into the stagnant process connection. The installation of the spray nozzle is mechanically complex as well as invasive to the vessel, requiring a separate vessel penetration (not shown) and the positioning of the line(s) inside the vessel for supplying the liquid to the spray nozzle. With this approach, the elevation and alignment of the spray nozzle itself, as well as the flow rate and spray pattern, are critical and, in practice, it is quite difficult to obtain the proper combination of these variables such that polymer accumulation is wholly prevented. While the effectiveness of such an arrangement could be improved through the use of multiple spray nozzle and an overwhelmingly large quantity of liquid spray, such an approach is costly and impractical in commercial operations. Additionally, the physical presence of the spray nozzle(s) and its supply line(s) create an undesirable obstruction in the process connection, thereby interfering with the free flow of material through the attached relief device, and these components themselves also create new surfaces for the accumulation of condensation polymer! In some instances the direct impingement of pressurized spray liquid on the relief device may also cause mechanical fatigue, thereby shortening the service life of the rupture disk. Because of these limitations, the proposed process for inhibiting polymerization is impractical when applied to the small, low flow regions associated with process connections, such as relief lines.

The use of spray rings of various designs is also known in the art as a means for cleaning the inside surfaces of sight glasses. Numerous patents have been issued for these devices and enhancements thereto, including U.S. Pat. No. 3,402,418, U.S. Pat. No. 4,158,508 and U.S. Pat. No. 4,541,277. Yet despite familiarity with the needs of the chemical process industries, those skilled in the art of designing sight glass spray rings have not anticipated the use of such devices for the prevention o unwanted material accumulation in low flow zones such as process connections.

In fact, despite these known methods, there remains a long-felt need to provide a simplified, reliable, inexpensive and effective means for preventing unwanted material accumulation in low flow regions, such as process connections. This need is especially great in the case where safety relief systems are attached to process connections comprising low flow regions; the accumulation of unwanted material in these nozzles restricting the free flow of material through the nozzle when the relief device is called upon to operate, thereby limiting the capacity of the relief device and creating an unsafe condition. The present invention overcomes the deficiencies of the prior art while meeting the needs of the chemical process industries.

Accordingly, in one embodiment of a first aspect of the present invention, there is provided a rupture disk assembly comprising a rupture disk and a rupture disk holder operatively engaging the rupture disk; wherein the rupture disk holder comprises a first annular member disposed in a downstream position relative to the rupture disk and a second annular member disposed in an upstream position relative to the rupture disk; wherein an outer peripheral portion of the rupture disk is sandwiched between the first annular member and the second annular member; wherein the second annular member includes at least one fluid port aimed at the rupture disk.

Alternatively, in a second embodiment of the first aspect of the present invention, there is provided a rupture disk assembly comprising a rupture disk and a rupture disk holder operatively engaging the rupture disk; wherein the rupture disk holder comprises a first annular member disposed in a downstream position relative to the rupture disk, a second annular member disposed in an upstream position relative to said rupture disk and a third annular member disposed in an upstream position relative to the second annular member; wherein an outer peripheral portion of the rupture disk is sandwiched between the first annular member and the second annular member; wherein the second annular member is sandwiched between the outer peripheral portion of the rupture disk and the third annular member; wherein the third annular member includes at least one fluid port aimed at the rupture disk.

In a second aspect, the present invention provides an equipment access assembly comprising an equipment access cover, an equipment access cover mount operatively engaging the equipment access cover and an annular member disposed between the equipment access cover and the equipment access cover mount; wherein the annular member includes at least one fluid port aimed at the equipment access cover.

In a third aspect, the present invention provides a valve mounting assembly comprising a downstream valve mount, an upstream valve mount, a valve disposed intermediate and operatively connected to the downstream valve mount and the upstream valve mount and an annular member disposed intermediate the valve and the upstream valve mount; wherein the annular member includes at least one fluid port aimed at the valve.

FIG. 2 is a partly sectional view of another embodiment of a rupture disk assembly in accord with the present invention.

FIG. 3 is a partly sectional view of a relief device assembly in accord with the present invention.

FIG. 4 is a partly sectional view of a first embodiment of a flush ring in accord with the present invention.

FIG. 5 is a partly sectional view of a second embodiment of a flush ring in accord with the present invention.

In the drawing figures, similar elements are similarly numbered.

In the following description, by "process equipment" is meant vessels, such as distillation columns, tanks and reactors, and process piping systems. By "process connections" is meant any extension of process equipment which can be utilized for the attachment of secondary process devices such as valves, instrumentation, pumps or pressure relief devices. Process connections include, but are not limited to, studding outlets, piping branches (e.g., piping tees), manways, handholes and flanged nozzles.

As will become apparent hereinafter, a key component of the present invention is a flush ring, i.e. an annular member having one or more fluid ports, the one or more fluid ports serving to direct a flushing fluid inwardly of said annular device, preferably toward the axis of the annulus. The annular member also includes an internal channel fluidically connecting the one or more ports to an external source of the flushing fluid. It is preferred that the annular member be of a constant external diameter. It is also preferred that the annular member be of a constant internal diameter. It is further preferred that the annular member comprises smooth and substantially parallel upper and lower surfaces of such a quality as to facilitate sealing when installed with conventional gaskets in a piece of process equipment.

Any gaseous or liquid material, compatible with the operation of the process, may be employed as the flushing fluid. The flushing fluid may be supplied continuously or intermittently, as required.

When installed in a low flow region, the flush ring serves to flush unwanted materials from the low flow region, thereby preventing their accumulation and avoiding the previously described processing difficulties associated with the accumulation of unwanted materials.

The flush ring may be optionally installed with a flow measurement/control device (such as a control valve, a needle valve or a rotometer) on the flush fluid supply connection. This serves to ensure proper flushing fluid flow is maintained at all times, as intended.

Figure 1:
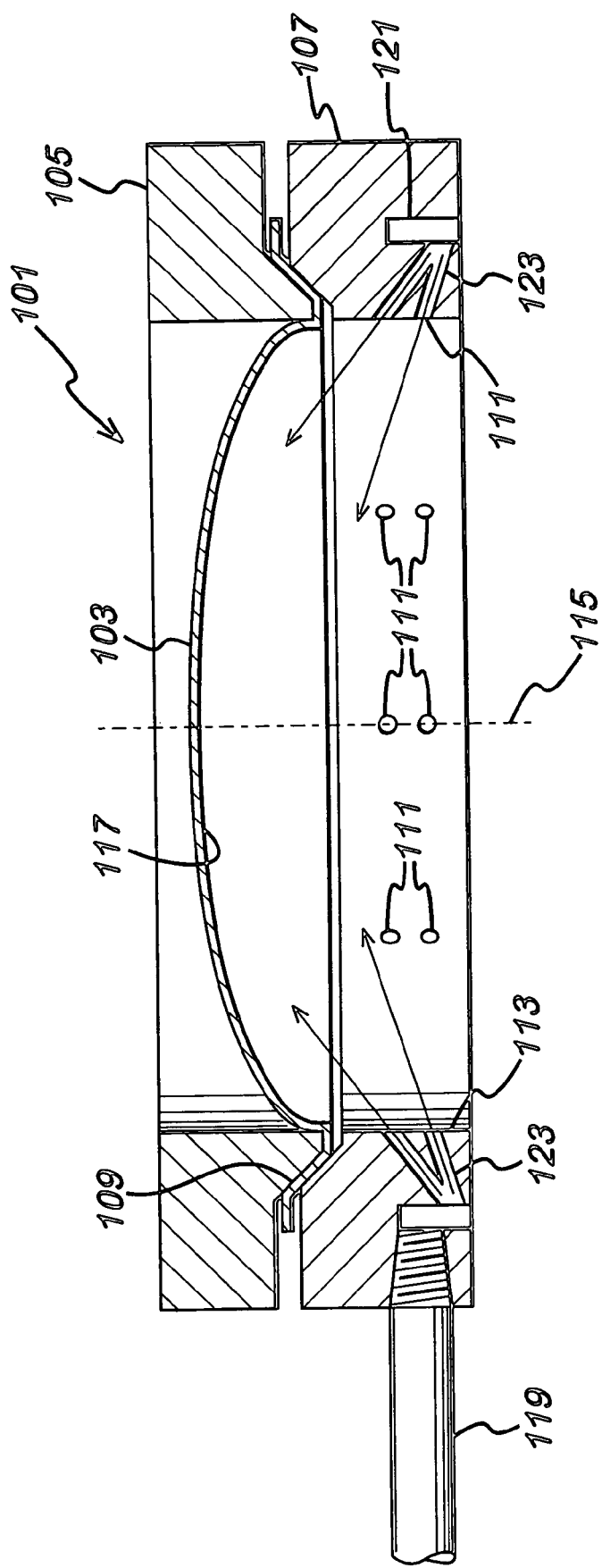
FIG. 1 is a partly sectional view of a rupture disk assembly in accord with the present invention.

FIG. 1 illustrates one embodiment of a flush ring in accord with the present invention. In this embodiment, an annular channel and fluid ports consistent with the present invention are incorporated directly into a rupture disk holder. In so doing, a fluid flush may be provided to prevent the accumulation of unwanted material, such as condensation polymer, in the low flow region upstream of a rupture disk.

The rupture disk assembly 101 is representative of conventional assemblies used in industrial chemical processes and comprises a rupture disk 103 contained in a two-piece rupture disk holder comprising a first annular member 105 disposed in a downstream position relative to the rupture disk 103 and a second annular member 107 disposed in an upstream position relative to the rupture disk 103. An outer peripheral portion 109 of the rupture disk 103 is sandwiched between the first annular member 105 and the second annular member 107. In accordance with the present invention, however, the second annular member 107 includes a plurality of fluid ports 111 in its interior face 113 through which a flushing fluid may be passed. The ports 111 are oriented at two different angles with respect to the axis 115 of the second annular member 107 in order to direct the flushing fluid (illustrated by the arrows) toward multiple points along the lower surface 117 of the rupture disk 103. The flushing fluid is supplied via a connection 119 to a source of flushing fluid (not shown) and an annular internal channel 121 which is operably connected to each of the ports 111 by respective feed channels 123.

FIG. 2 illustrates an embodiment of the flush ring in accord with the present invention wherein only two fluid ports are utilized. In particular, fluid port 211a is oriented at a first angle with respect to the axis 215 of the second annular member 207 and conducts flushing fluid (illustrated by the arrow) toward a first area on the lower surface 217 of the rupture disk 203. Fluid port 211a is supplied via a radially-oriented hole 225a and feed channel 223a in the second annular member 207. The radially-oriented hole 225a serves to conduct flushing fluid from the connector 219a which is in turn connected to a source of flushing fluid (not shown). Similarly, fluid port 211b (located on the diametrically opposite side of the second annular member) is oriented at a second angle (different from the first angle) with respect to the axis 215 and flushing fluid toward a second area on the lower surface 217 of the rupture disk 203. Fluid port 211b is supplied via a radially-oriented hole 225b and feed channel 223b in the second annular member 207. The radially-oriented hole 225b serves to conduct flushing fluid from the connector 219b which is in turn connected to a source of flushing fluid (not shown).

Connector 219a and connector 219b may draw flushing fluid from the same source or may optionally use different flushing fluids—for example, one fluid may comprise water and the other fluid may comprise an organic solvent such as hexane, or alternatively, one fluid may comprise phenolic inhibitor solution and the other may comprise an oxygen-containing gas.

FIG. 3 illustrates another embodiment of the flush ring in accord with the present invention which, while functionally similar to the apparatus of FIGS. 1 and 2, is an independent part. This independent flush ring is used to prevent the accumulation of unwanted material, such as condensation polymer, in the low flow region, generally indicated as 327, upstream of a relief device assembly, generally indicated as 329. The relief device assembly 329 is representative of conventional assemblies used in industrial chemical processes, one example of which is described in U.S. Pat. No. 6,311,715. The relief device assembly in this preferred embodiment comprises a reverse-buckling rupture disk 304 (contained in a two-piece rupture disk holder comprising a first annular member 305 and a second annular member 307). Suitable reverse-buckling rupture disks are commercially available from Continental Disc Corporation, Fike, and Oseco. The relief device also comprises a downstream relief valve 330 separated by a short pipe spool 331 from the rupture disk holder. The placement of the rupture disk upstream of the relief valve serves to prevent fouling of the relief valve inlet port and also minimizes potential emissions should the relief valve fail to maintain a seal under normal operating conditions.

The relief device assembly also includes a pressure gauge 333 connected to a pipe spool 331; this gauge provides an external indication of a pressure change between the rupture disk and the valve, thereby signaling when the rupture disk has burst and when changeout is required. In this embodiment, the flush ring 335 is installed upstream (below) and adjacent to the second annular member 307 of the rupture disk holder and may be held in place with through-bolting or other conventional means (not shown). A supply of flushing fluid is connected to the ring via a conduit 337 and the flushing fluid flows into an internal channel of the ring. The internal channel is annular and distributes the flushing fluid to a plurality of ports, located radially along the inner circumference of the flush ring. In this embodiment, one set of ports is positioned at a first orientation angle with respect to the axis of the ring and another set of ports is positioned at a second (different) orientation angle with respect to the axis of the ring. As flushing fluid is ejected through the ports, it is directed upward, toward the exposed upstream surfaces of the rupture disk, as shown by the arrows, thereby displacing the otherwise stagnant contents of low flow region 327 and preventing the accumulation of unwanted materials in this region.

FIG. 4 is a partly sectional view of a first embodiment of a flush ring 435 in accord with the present invention, such as was utilized in the assembly of FIG. 3. In particular, the flush ring 435 comprises an annular member 439 including a plurality of fluid ports 411 in its interior face 413 through which a flushing fluid may be passed. The ports 411 are oriented at two different angles with respect to axis 415 of the annular member 439 in order to direct the flushing fluid (illustrated by the arrows) toward multiple points along the surface of a rupture disk (not shown). The flushing fluid is supplied via a connection 419 to a source of flushing fluid (not shown) and an annular internal channel 421 which is operably connected to each of the ports 411 by respective feed channels 423.

FIG. 5 is a partly sectional view of a second embodiment of a flush ring 535 in accord with the present invention, such as can be utilized in the assembly of FIG. 3. In particular, the flush ring 535 comprises an annular member 539 and an annular disk 541. The annular member 539 includes a plurality of fluid ports 511 in it interior face 513 through which a flushing fluid may be passed. The ports 511 are oriented at two different angles with respect to the axis 515 of the annular member 539 in order to direct the flushing fluid (illustrated by the arrows) toward multiple points along the surface of a rupture disk (not shown). The flushing fluid is supplied via a connection 519 to a source of flushing fluid (not shown) and an annular internal channel 521 which is operably connected to each of the ports 511 by respective feed channels 523. The annular disk 541 preferably has an inner diameter ID equal to that of annular member 539. Similarly, the annular disk 541 preferably has an outer diameter OD equal to that of annular member 539. The annular disk 541 is fluid tightly sealed (e.g., as by welding) to the lower face 543 of annular member 539 so as to fluid tightly close the annular internal channel 521 so as to assure that there is no leakage of flushing fluid therefrom.

Figure 6:
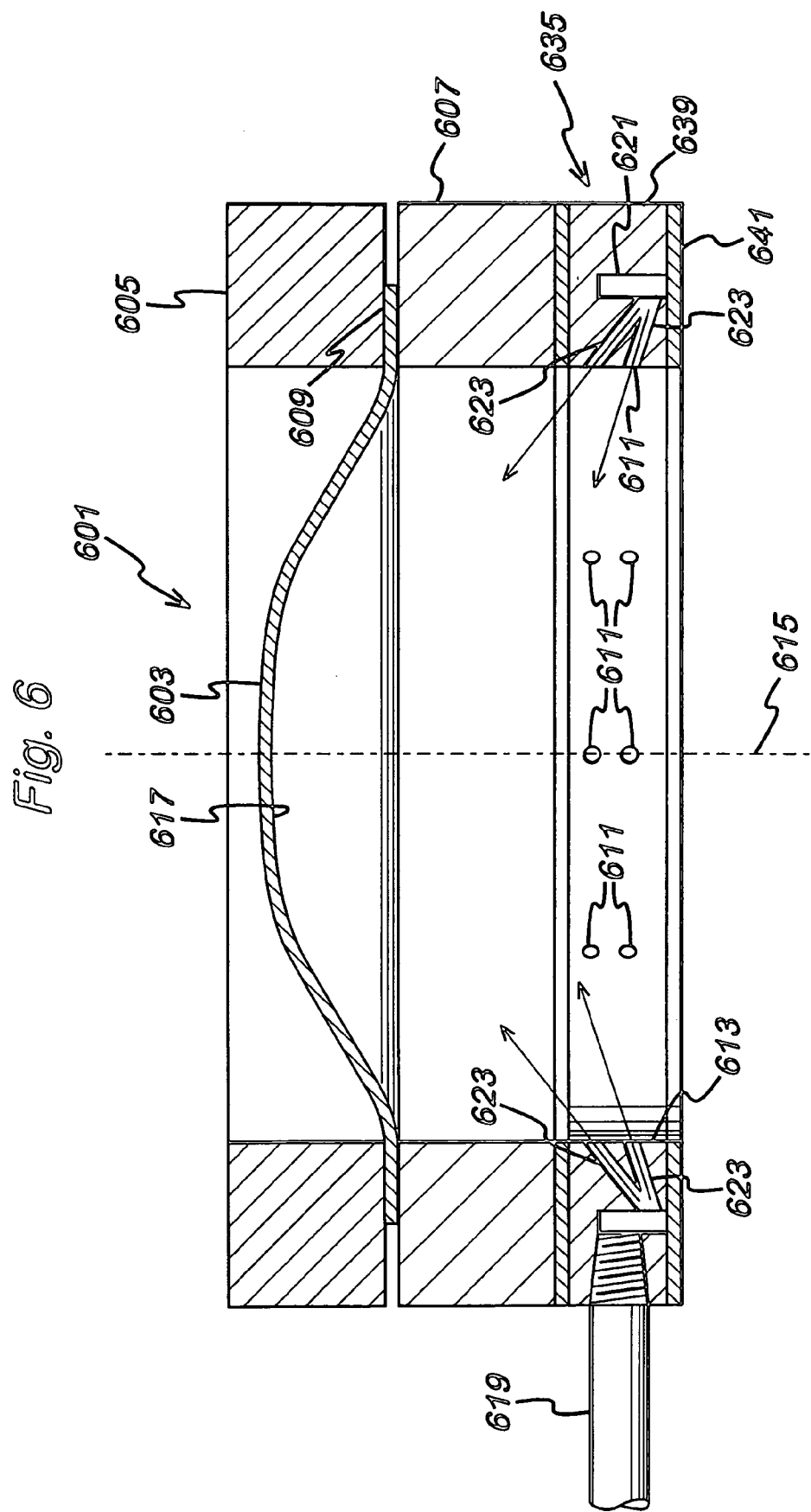
FIG. 6 is a partly sectional view of a still further embodiment of a rupture disk assembly in accord with the present invention.

FIG. 6 is a partly sectional view of a still further embodiment of a rupture disk assembly 601, in accord with the present invention, which comprises a rupture disk 603 contained in a two-piece rupture disk holder comprising a first annular member 605 disposed in a downstream position relative to the rupture disk 603 and a second annular member 607 disposed in an upstream position relative to the rupture disk 603. An outer peripheral portion 609 of the rupture disk 603 is sandwiched between the first annular member 605 and the second annular member 607. A flush ring 635, comprising a third annular member 639 and an annular disk 641, fluid tightly sealed thereto, is disposed in an upstream position relative to the second annular member 607. The second annular member 607 is sandwiched between the outer peripheral portion 609 of the rupture disk 603 and the flush ring 635. A gasket 645 is interposed between the second annular member 607 and the flush ring 635 so as to ensure a fluid tight seal therebetween. The third annular member 639 includes a plurality of fluid ports 611 in its interior face 613 through which a flushing fluid may be passed. The ports 611 are oriented at two different angles with respect to axis 615 of the third annular member 639 in order to direct the flushing fluid (illustrated by the arrows) toward multiple points along the lower surface 617 of the rupture disk 603. The flushing fluid is supplied via a connection 619 to a source of flushing fluid (not shown) and a closed annular internal channel 621 which is operably connected to each of the ports 611 by respective feed channels 623.

Although the majority of the preceding discussion is focused on flanged nozzles attached to process vessels, it is envisioned that other low flow regions may also benefit from the present invention.

Figure 7:
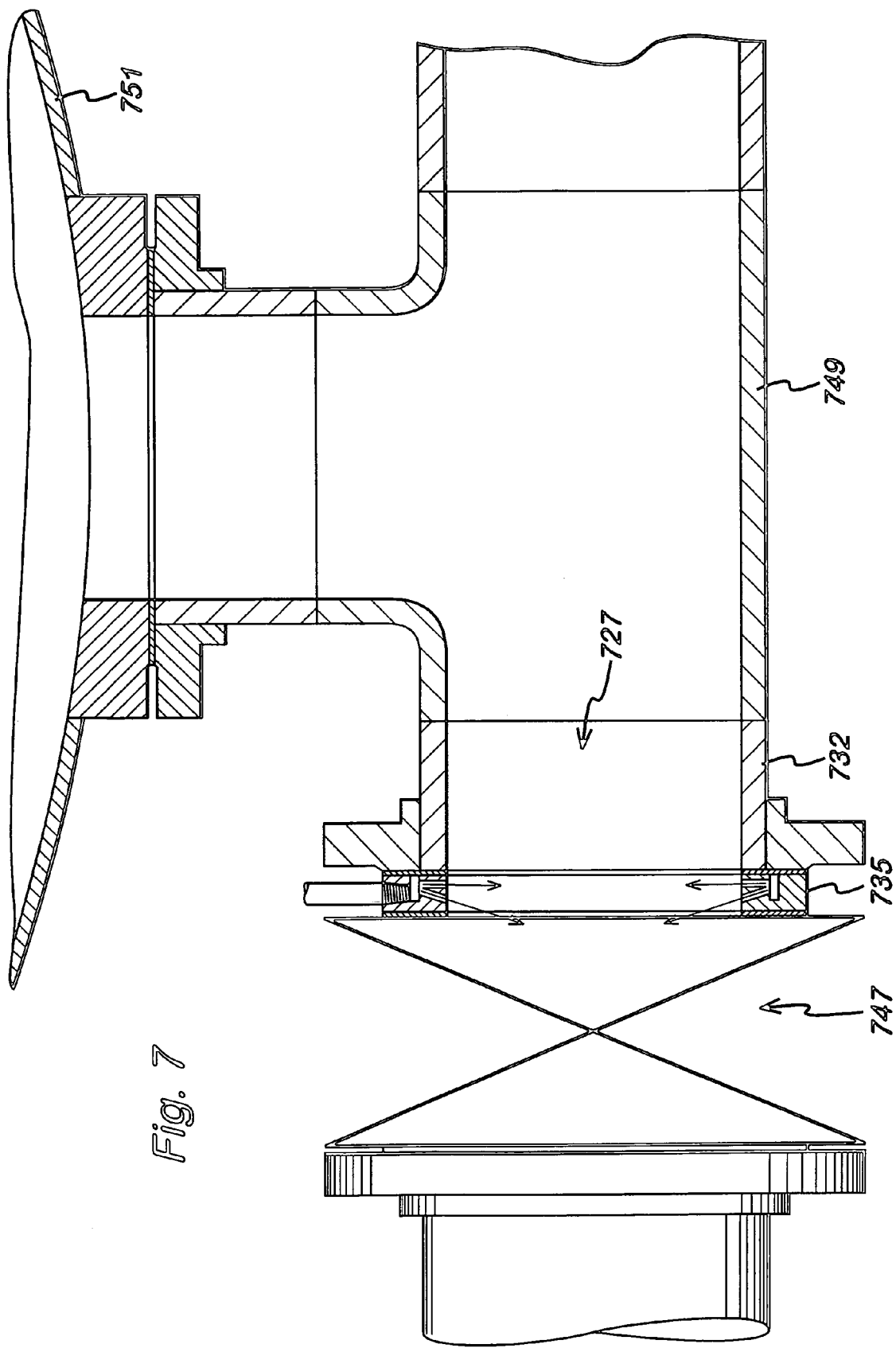
FIG. 7 is a partly sectional view of a valve mounting assembly in accord with the present invention.

For example, in one embodiment (see FIG. 7), the low flow region 727 is within a short section of piping 732 adjacent to a valve 747 in the exit line 749 for a hydrogen cyanide reactor 751. During process upsets, the valve can be opened, allowing the hydrogen cyanide containing product gas to be diverted to a flare for safe destruction. Under normal operating conditions, the valve 747 is closed, creating a low-flow region at its face that could accumulate unwanted material, such as cyanide polymer. By placing a flush ring 735 of the present invention adjacent to the valve, as shown, and introducing a flushing fluid via the ring, the accumulation of unwanted materials is prevented and operability of the valve is maintained. Suitable flushing fluids may include but are not limited to $N_2$, $SO_2$, steam, $CH_4$, $H_2$ and air. The flushing fluid may optionally be heated and the flow rate of the fluid may be varied, if desired.

Figure 8:
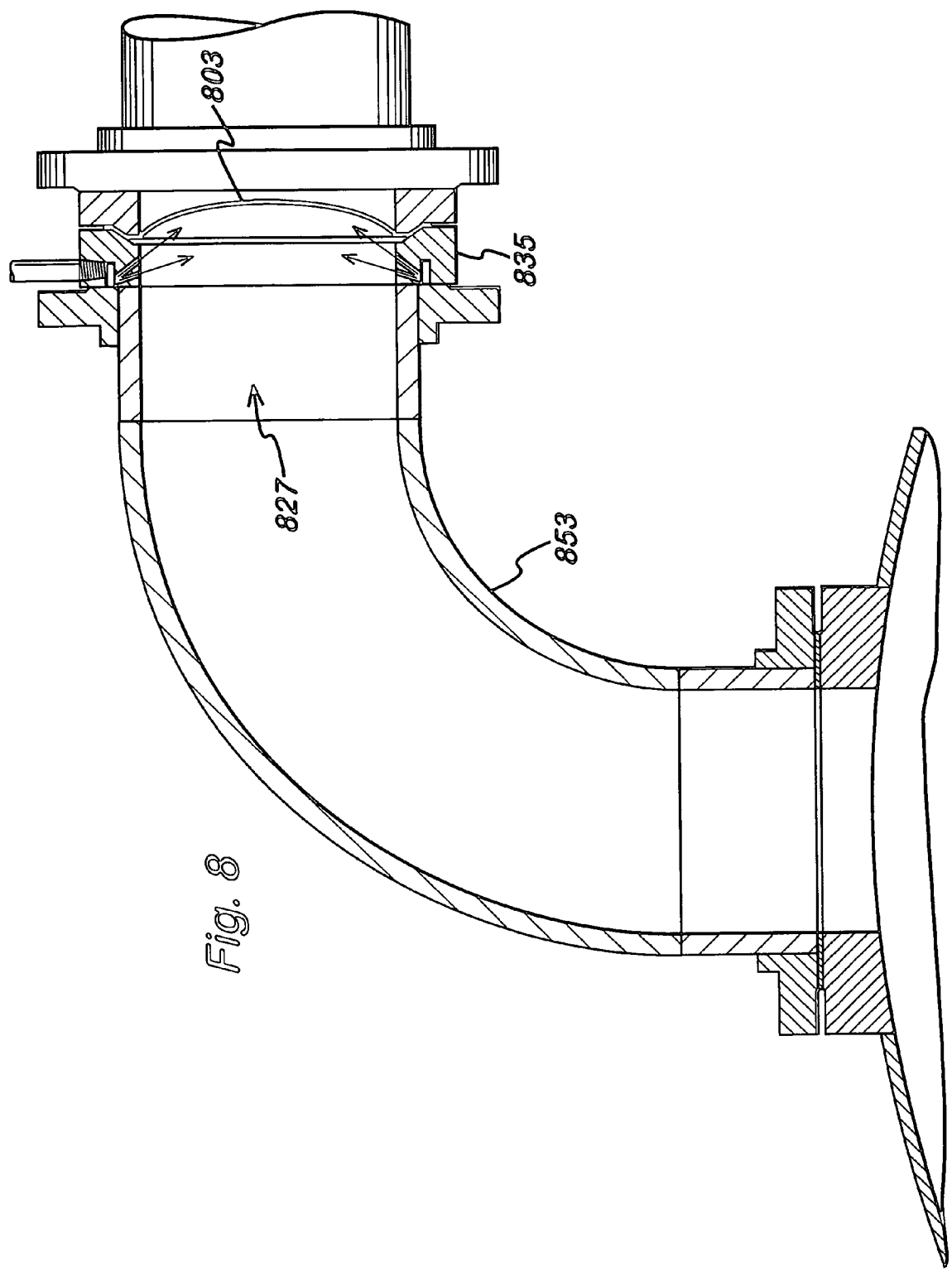
FIG. 8 is a partly sectional view of a rupture disk assembly of the type shown in FIG. 1 disposed in the pressure relief line on a chemical reactor in accord with the present invention.

In another embodiment (see FIG. 8), the low flow region 827 is in the pressure relief line 853 on a chemical reactor 855, e.g., a batch emulsion polymerization reactor. A rupture disk 803 is installed in the horizontal portion of the pressure relief line and, over the course of a batch polymerization, vapor phase monomers may accumulate in the relief line upstream of the rupture disk. By placing a flush ring 835 of the present invention adjacent to the rupture disk, as shown, an introducing a flushing fluid comprising cleaning solvent following the completion of each batch, the rupture disk and the relief line are regularly cleared and remain free of unwanted material accumulation.

Figure 9:
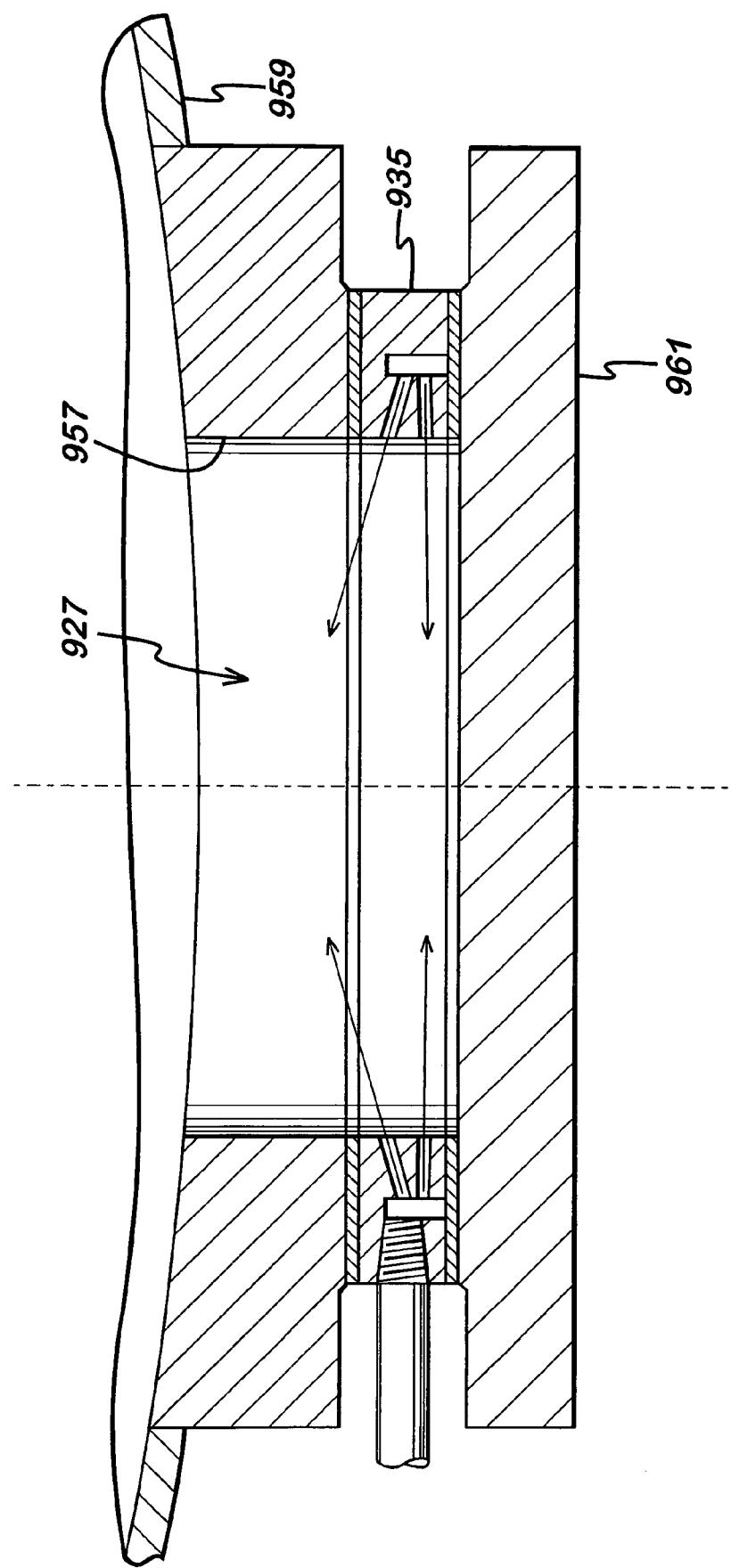
FIG. 9 is a partly sectional view of a flush ring mounted in the bottom cleanout connection of a liquid filled crude-product tank in accord with the present invention.

In still another embodiment (see FIG. 9), the low flow region 927 is within the blinded bottom cleanout connection 957 on a liquid filled crude product tank 959. Under normal conditions, the blind 961 is present on the cleanout connection to provide a liquid-tight seal on the tank. Various unwanted materials such as precipitates, corrosion products, insoluble impurities, and the like may also be present. During maintenance periods, it is desirable to remove the blind and to use the drain connection as a conduit through which the contents of the tank may be removed. By placing a flush ring 935 of the present invention adjacent to the blind, as shown, and introducing a flushing fluid via the ring, the accumulation of unwanted material is prevented and the drain connection is ready for use on demand. Suitable flushing fluids may include $N_2$, air or a slip stream of crude product.

It is understood that the flushing fluid may be a gas or a liquid and may be supplied continuously or intermittently, as required. Any gas or liquid material compatible with the operation of the particular process in question may be used as the flushing fluid. For example, in the operation of a distillation column for the production of (meth)acrylic acid or esters thereof, suitable materials include, but are not limited to, oxygen-containing gas (e.g., air), vapor phase polymerization inhibitors, water, (meth)acrylic acid, methyl-isobutyl-ketone (MIBK), toluene and acetone. In some embodiments, the flushing fluid may comprise distillation column reflux or unpurified distillation column feed. The flushing fluid may optionally be passed through a heat exchanger to control its temperature and may optionally comprise one or more polymerization inhibitors.

It is further understood that the flush ring may comprise one or more ports and that the ports may be at one or more orientation angles with respect to the axis of the flush ring. Suitable orientation angles are between 0 and 90 degrees with respect to the axis of the flush ring. The selection of orientation angles, as well as the size and number of ports, and the flushing fluid flow rate are a function of the internal diameter of the flush ring, the orientation of the surface to be treated (e.g., in the case of a rupture disk whether the surface is concave or convex) and the distance between the ports and the surface to be treated. Because of their designs, both the flush ring and the relevant element of process equipment (e.g., the rupture disk holder) can be repeatably assembled in the same configuration in the laboratory as is required in the process, thus allowing one of ordinary skill in the art to verify, in the laboratory, that the proper design variables have been selected through simple visual observation under flush fluid flow conditions. For example, if water is used as the flush fluid, it would be apparent that the proper variables have been selected when, by visual observation under operating conditions, the rupture disk is determined to be completely wetted by the water flush.

With the benefit of the disclosure of the present invention, it is envisioned that for certain process uses the benefits of the flush ring can be reasonably well approximated through the installation of a commercially available spray ring device. Such spray ring devices are marketed for the purpose of cleaning sight glasses and may be purchased in standard sizes from LJStar Inc. (Twinsburg, Ohio) or Canty (Buffalo, N.Y.). Because these devices are designed for a different purpose, use of the aforementioned visual test method I essential to verify that the selected "standard" device can meet the requirements of the process service.

EXAMPLE

A flush ring is placed adjacent to the rupture disk holder on the 8-inch diameter top process connection nozzle of an acrylic acid distillation column in the manner as shown in FIG. 3. A 316-teflon-316 composite rupture disk (available from Continental Disc Corp.) was installed in the holder. The flush ring had an internal diameter 7½ inches and comprised two sets of fluid *ports*. T*he* first set of ports comprises 8 equally spaced 3/32-inch diameter ports set at an angle of between 45 and 90 degrees relative to the axis of the ring. The second set of ports comprises 8 equally spaced 3/32-inch diameter ports set at an angle between 0 and 45 degrees relative to the axis of the ring. The flushing ring further comprises an open distribution channel which is sealed upon installation against a standard gasket flange. After installation, a flushing fluid is introduced through the ring which facilitates the removal of condensed polymerizable acrylic acid monomer from the upstream (lower) interior surfaces of the rupture isk, thereby preventing accumulation of unwanted polymer. The flushing fluid is a liquid mixture comprising acrylic acid (distillation column feed), acetic acid and hydroquinone inhibitor, and is supplied at a continuous flow rate of approximately 2 gpm. Oxygen-containing gas is present in the column vapor spaces as a routine aspect of operating the distillation column. The acrylic acid distillation column was operated with the flush ring in this configuration for 6 months during which time the disk and process connection nozzle were inspected a total of 5 times. During each inspection, both the disk and the process nozzle connection were inspected and found to be free of polymer accumulation.

COMPARATIVE EXAMPLE

Figure 10:
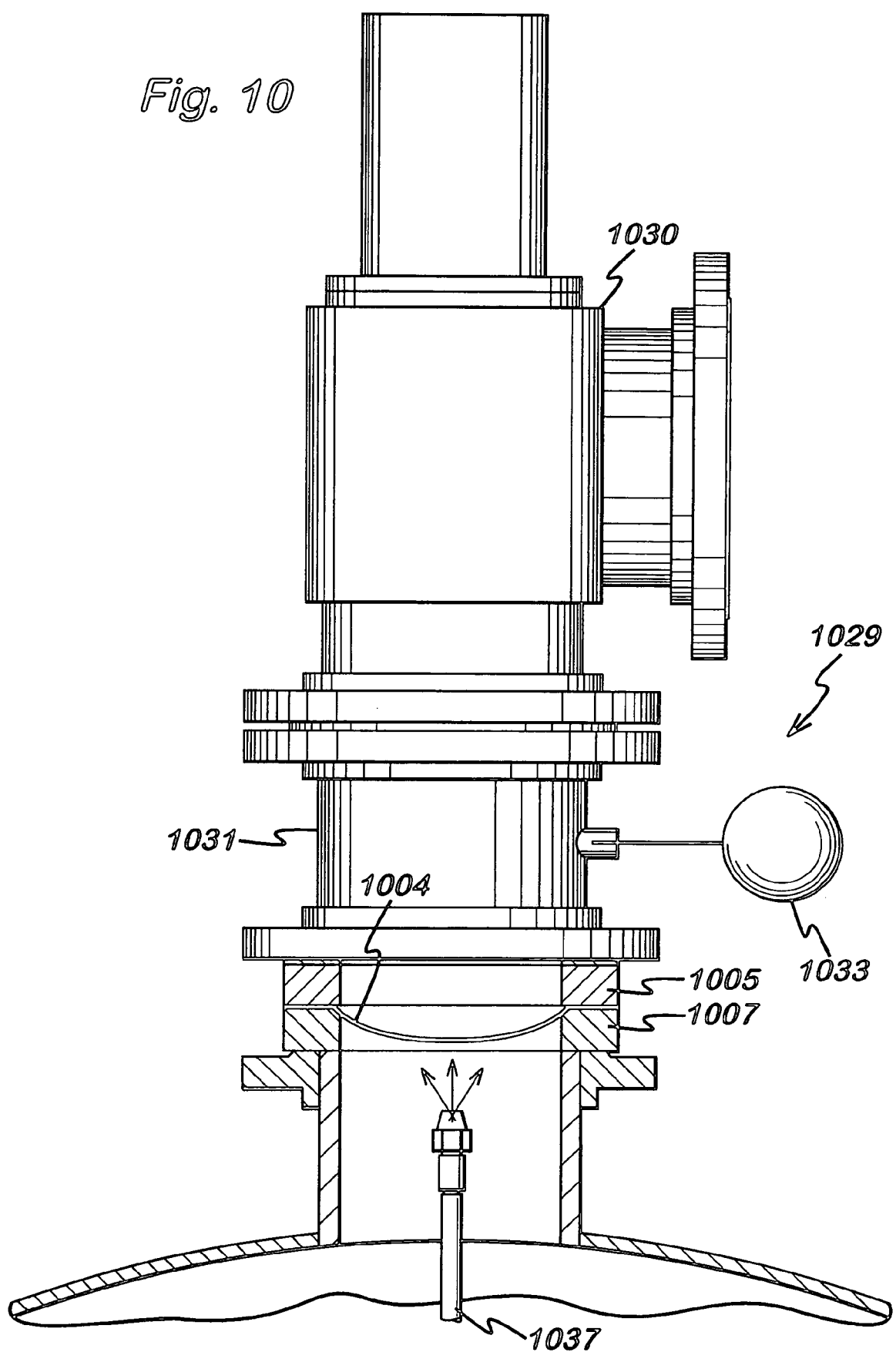
FIG. 10 is a partly sectional view of a relief device assembly using a spray nozzle system.

On the same 8-inch diameter top process connection nozzle, a single ⅜-inch Spiraljet® full-cone spray nozzle (Spraying Systems Co., Wheaton, Ill.) was installed in the manner as shown in FIG. 10 in an attempt to prevent polymer accumulation on the aforementioned composite rupture disk. A pressurized liquid mixture comprising acrylic acid (distillation column feed), acetic acid and hydroquinone inhibitor were supplied at a continuous flow rate of approximately 2 gpm to the Spiraljet® spray nozzle and subsequently sprayed into the process connection nozzle and onto the lower portion of the rupture disk. Oxygen-containing gas is present in the column vapor spaces as a routine aspect of operating the distillation column. The acrylic acid distillation column was operated with this configuration during which time the disk and process connection nozzle were inspected several times. Over varying operating periods—some as short as three weeks—significant amounts of polymer were found to have accumulated within the process connection nozzle and on the rupture disk itself, requiring the process connection nozzle to be cleaned and the rupture to be replaced. Typically, the process connection nozzle cross-section was found to be 60–90% obstructed with polymer, when inspected.

What is claimed is:

1. A valve mounting assembly comprising:
   (i) a downstream valve mount;
   (ii) an upstream valve mount;
   (iii) a valve having an upstream face adjacent to a low-flow region of process fluids and being disposed intermediate said downstream valve mount and said upstream valve mount; and
   (iv) an annular member disposed intermediate said valve and said upstream valve mount;
   wherein said annular member includes at least one fluid port aimed at said upstream face of said valve, whereby accumulation of unwanted material thereon is prevented.

2. A valve mounting assembly comprising:
   (i) a valve mount;
   (ii) a valve having an upstream face and being disposed downstream of said valve mount; and
   (iii) an annular member disposed intermediate said valve mount and said valve;
   wherein said annular member includes at least one fluid port aimed at said upstream face of said valve, whereby accumulation of unwanted material thereon is prevented.

3. The valve mounting assembly according to claim 2, wherein said valve is a relief valve.

* * * * *